(12) United States Patent
Kimura (10) Patent No.: US 8,035,829 B2
(45) Date of Patent: Oct. 11, 2011

(54) IMAGE PROCESSING APPARATUS, MAGNIFICATION RATIO DISTRIBUTION DETERMINATION METHOD, PROGRAM, AND RECORDING MEDIUM

(75) Inventor: Shuji Kimura, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 998 days.

(21) Appl. No.: 11/984,401

(22) Filed: Nov. 16, 2007

(65) Prior Publication Data

US 2008/0117457 A1 May 22, 2008

(30) Foreign Application Priority Data

Nov. 22, 2006 (JP) ................................ 2006-315906

(51) Int. Cl.
*G06F 3/12* (2006.01)
*H04N 1/04* (2006.01)
(52) U.S. Cl. ....................................... 358/1.13; 358/1.1
(58) Field of Classification Search .................. 358/1.1, 358/19, 1.12, 1.13, 1.14, 1.15, 1.17, 474, 358/448, 501, 540; 382/167, 232, 276, 305, 382/307
See application file for complete search history.

(56) References Cited

U.S. PATENT DOCUMENTS

| | | | | |
|---|---|---|---|---|
| 5,553,201 A | * | 9/1996 | Muramatsu | 358/1.9 |
| 5,771,104 A | * | 6/1998 | Sakano | 358/451 |
| 6,476,868 B1 | * | 11/2002 | Kaji et al. | 348/333.12 |
| 6,486,971 B1 | * | 11/2002 | Kawamoto | 358/1.2 |
| 7,209,260 B1 | * | 4/2007 | Tanaka et al. | 358/1.2 |
| 7,664,320 B2 | * | 2/2010 | Yoshida et al. | 382/167 |
| 2001/0055066 A1 | * | 12/2001 | Nozawa | 348/240 |
| 2002/0000989 A1 | * | 1/2002 | Suzuki | 345/472 |
| 2004/0174444 A1 | * | 9/2004 | Ishii | 348/240.1 |
| 2005/0018258 A1 | * | 1/2005 | Miyagi et al. | 358/521 |

FOREIGN PATENT DOCUMENTS

| | | |
|---|---|---|
| JP | 2005-269379 | 9/2005 |
| JP | 2006-067018 | 3/2006 |

* cited by examiner

*Primary Examiner* — Gabriel Garcia (57) ABSTRACT

The present invention increases output throughput and enhances user-friendliness by subjecting image data to magnification processing by an optimal image processing means, with an optimal magnification ratio, in accordance with a service provided to a user. When a service provided to the user is selected and a magnification ratio is set, a CPU of a MFP determines the distribution of respective magnification ratios of a first image data processor and a second image data processor. For instance, when the selected service is a "service relating to the output of image data" the distribution of respective magnification ratios is determined so that magnification processing with the set magnification ratio is carried out in the first image data processor. When the selected service is "a plurality of services relating to the output of image data", and the set magnification ratios are all identical for each service, the distribution of respective magnification ratios is determined so that magnification processing with the respective magnification ratios is carried out in the first image data processor. When the set magnification ratios are different for each service, the distribution of respective magnification ratios is determined so that magnification processing with the respective magnification ratios is carried out in the second image data processor.

21 Claims, 3 Drawing Sheets

IMAGE PROCESSING APPARATUS, MAGNIFICATION RATIO DISTRIBUTION DETERMINATION METHOD, PROGRAM, AND RECORDING MEDIUM

PRIORITY STATEMENT

This application claims benefit of priority under 35 U.S.C. §119 from Japanese Patent Application No. 2006-315906 filed on Nov. 22, 2006, in the Japanese Patent Office, the disclosure of which is incorporated herein by reference in its entirety.

BACKGROUND OF THE INVENTION

1. Field of the Invention

The present invention relates to an image processing apparatus such as an image forming apparatus (digital multifunction machine, digital copier, fax machine, printer or the like), an image reading device (scanner or the like), or a personal computer (hereinafter, PC for short), to a magnification ratio distribution determination method in the image processing apparatus, to a program executed in a computer (CPU) controlling the image processing apparatus, and to a computer-readable recording medium in which the program is recorded.

2. Description of the Related Art

In recent years there have been proposed image processing apparatuses, for instance as disclosed in Japanese Unexamined Patent Application Laid-open No. 2005-269379, in which magnification ratio (resolution) can be set, through operation of an operative unit by a user, during transmission of image data stored in a memory device to an external device such as a PC or the like.

There have also been proposed image processing apparatuses, for instance as disclosed in Japanese Unexamined Patent Application Laid-open No. 2006-67018, in which, with a view to preventing miscopy and/or enhancing user-friendliness, a size to be printed is preset in accordance with the size of a document, so that a document image is printed scaled to a printing size that is set based on the size of the document actually read, and in which, through a simple operation of document insertion by the user, the read image data is aggregated and printed with a magnification ratio according to the printing size after magnification and according to the size of the read-document.

Although the apparatus in Japanese Unexamined Patent Application Laid-open No. 2005-269379 comprises magnification processing means that can use magnification processing of image data stored in a memory device, magnification ratio is not optimally determined therein taking into account output (printing or transmission) throughput (processing speed) and reusability, for each service provided to a user, during storage of image data in the memory device.

Also, although the apparatus in Japanese Unexamined Patent Application Laid-open No. 2006-67018 succeeds in enhancing user-friendliness by resorting to some magnification processing schemes, magnification ratio is not optimally determined therein taking into account output throughput and reusability, for each service provided to a user, during storage of image data in the memory device.

SUMMARY OF THE INVENTION

In light of the above problems, it is an object of the present invention to increase output throughput and enhance user-friendliness by subjecting image data to magnification processing by optimal image processing means, with an optimal magnification ratio, in accordance with a service provided to the user.

In accordance with an aspect of the present invention, an image processing apparatus comprises a first image processing device for carrying out image processing on image data from an image reading device for reading an image of a document; an image storage device for storing image data from the image reading device or the first image processing device; a second image processing device for carrying out image processing on image data from the image storage device; an image output device for outputting image data from the first image processing device, the image storage device or the second image processing device; a magnification processing device provided in the first image processing device and the second image processing device, for subjecting respective image data to magnification processing; a service selection device for selecting a service provided to a user; a magnification ratio setting device for setting a magnification ratio for image data; and a magnification ratio distribution determining device for, when a service is selected by the service selection means and a magnification ratio is set by the magnification ratio setting device, determining a distribution of respective magnification ratios of the first image processing device and the second image processing device in accordance with the selected service.

In accordance with another aspect of the present invention, in a magnification ratio distribution determination method in an image processing apparatus having a first image processing device for carrying out image processing on image data from an image reading device for reading an image of a document, an image storage device for storing image data from the image reading device or the first image processing device, a second image processing device for carrying out image processing on image data from the image storage device, and an image output device for outputting image data from the first image processing device, the image storage device or the second image processing device, when a service provided to a user is selected and a magnification ratio is set, a distribution of respective magnification ratios of the first image processing device and the second image processing device is determined in accordance with the selected service.

In accordance with another aspect of the present invention, a program for controlling an image processing apparatus having a first image processing device for carrying out image processing on image data from an image reading device for reading an image of a document, an image storage device for storing image data from the image reading device or the first image processing device, a second image processing device for carrying out image processing on image data from the image storage device, and an image output device for outputting image data from the first image processing device, the image storage device or the second image processing device, the program comprises a service selection function for selecting a service provided to a user; a magnification ratio setting function for setting a magnification ratio for image data; and a magnification ratio distribution determining function for, when a service is selected by the service selection function and a magnification ratio is set by the magnification ratio setting function, determining a distribution of respective magnification ratios of the first image processing device and the second image processing device in accordance with the selected service.

In accordance with another aspect of the present invention, a computer-readable recording medium is provided for storing a program. In an image processing apparatus having a first image processing device for carrying out image processing on image data from an image reading device for reading an image of a document, an image storage device for storing image data from the image reading device or the first image processing device, a second image processing device for carrying out image processing on image data from the said image storage device, and an image output device for outputting image data from the first image processing device, the image storage device or the second image processing device, the program causes a computer for controlling the image processing apparatus to execute a service selection function for selecting a service provided to a user; a magnification ratio setting function for setting a magnification ratio for image data; and a magnification ratio distribution determining function for, when a service is selected by the service selection function and a magnification ratio is set by the magnification ratio setting function, determining a distribution of respective magnification ratios of the first image processing device and the second image processing device in accordance with the selected service.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

The present invention is explained in detail next with reference to accompanying drawings. The present invention will be illustrated based on an example using herein, as the image processing apparatus, an image forming apparatus, in particular, a digital multifunction device (hereinafter "MFP") having a plurality of functions and which combines a copier, a scanner, a printer, a fax machine and the like.

Figure 1:
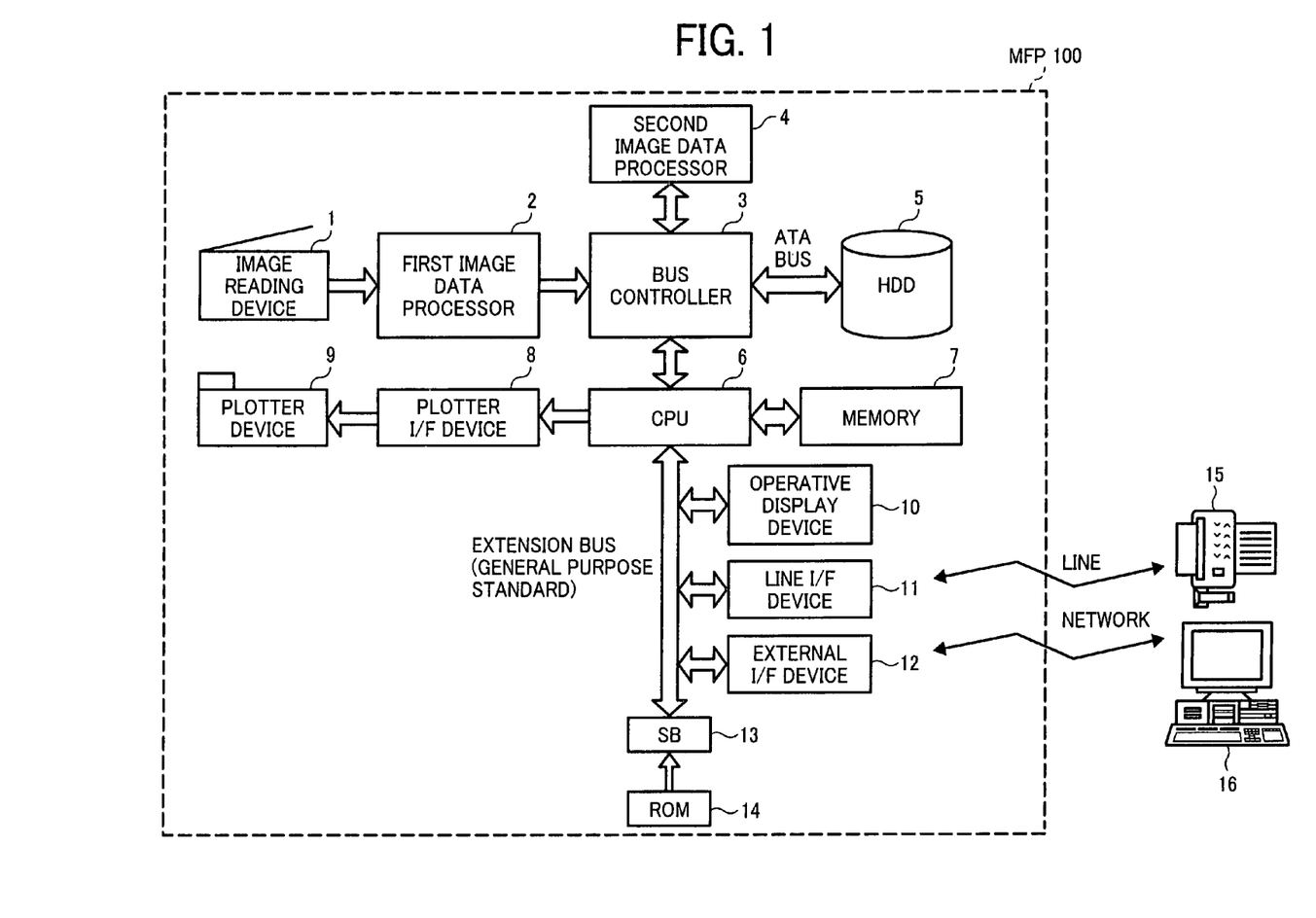
FIG. 1 is a block diagram illustrating a hardware configuration example of an image forming apparatus of the present invention.

A hardware configuration example of the relevant portion of the MFP of the present invention will be explained in detail first with reference to FIG. 1.

The MFP 100 comprises, for instance, an image reading device (scanner) 1, a first image data processor 2, a bus controller 3, a second image data processor 4, an HDD (hard disk device) 5, a CPU 6, a memory 7, a plotter interface device 8 (hereinafter "interface" is shortened to "I/F"), a plotter device 9, an operative display device 10, a line I/F device 11, an external I/F device 12, an SB 13, and a ROM 14.

The image reading device 1, which is image reading means, comprises an A/D converter, a line sensor comprising a CCD photoelectric conversion element, and a driving circuit of the foregoing, by means of which the image reading device 1 reads an image of a document and outputs image data. For instance, the image reading device 1 generates and outputs RGB 8-bit image data on the basis of density information of a document image obtained by scanning a set document. In "RGB", R denotes red, G denotes green, and B denotes blue.

In the below-described "CMYK", C denotes cyan, M denotes magenta, Y denotes yellow and K denotes black.

The image reading device 1 may be of a type in which a document is scanned by moving a carrier having mounted thereon a light source and/or a mirror, or of a type in which the document is scanned while being transported. In the former case, the direction along which the carrier is moved is called the sub-scanning direction, while in the latter case the sub-scanning direction refers to the transport direction of the document. The longitudinal direction of a line sensor perpendicular to the sub-scanning direction is called the main scanning direction.

In the present embodiment, the image reading device 1 can modify the magnification ratio of the read image in the sub-scanning direction by modifying the scanning speed in the sub-scanning direction. Hereinafter, image magnification through changes in the magnification ratio in the sub-scanning direction will be called sub-scanning mechanical magnification.

Figure 2:
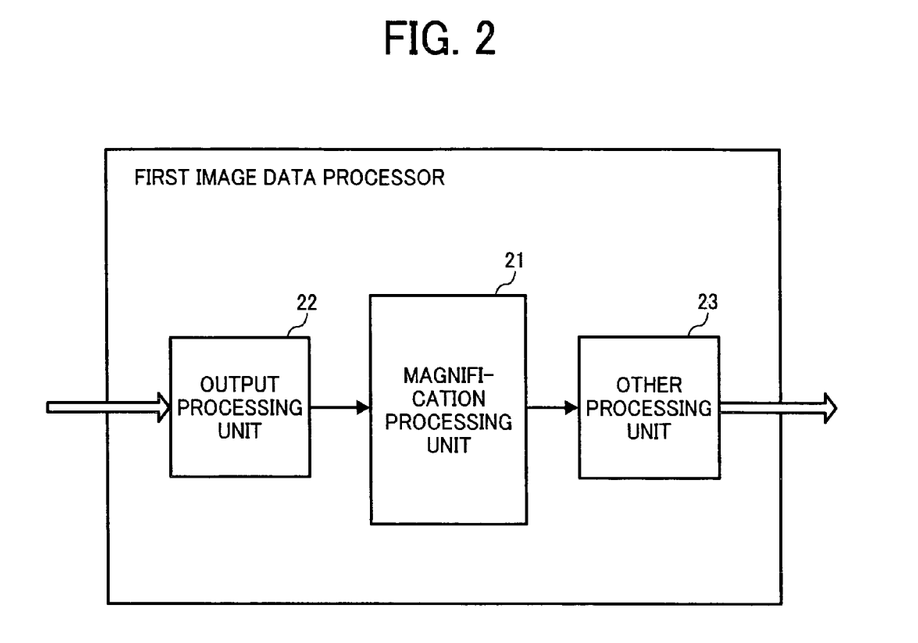
FIG. 2 is a block diagram illustrating a schematic constitution example of a first image data processor of the image forming apparatus.

The first image data processor 2, which is first image processing means, comprises, for instance as illustrated in FIG. 2, a magnification processing unit 21, which is magnification processing means, for carrying out magnification processing (resolution conversion) of image data from the image reading device 1; and other processing units 22, 23. By means of these processing units the MFP 100 (hereinafter "machine") can perform appropriate processing on the image data from the image reading device 1, in accordance with the type of a below-described service (function) that is provided to a user. The other processing units 22, 23 perform on the image data from the image reading device 1 image processing other than magnification processing, for instance γ-processing, filtering and color conversion.

The bus controller 3, which is a data bus controller for exchanging various data such as image data required in the MFP 100, as well as control commands and the like, has a bridge function between plural kinds of bus standards. In the present embodiment, the bus controller 3 is made into an ASIC (application specific integrated circuit), and is connected via a PCI-express bus to the first image data processor 2, the second image data processor 4 and the CPU 6, and via an ATA bus to the HDD 5.

Figure 3:
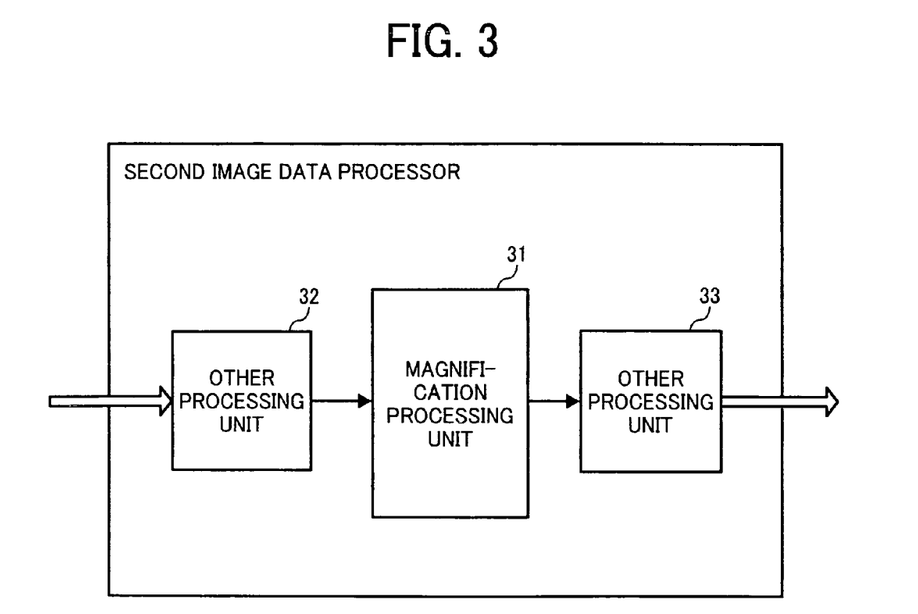
FIG. 3 is a block diagram illustrating a schematic constitution example of a second image data processor of the image forming apparatus.

The second image data processor 4, which is second image processing means, comprises, for instance as illustrated in FIG. 3, a magnification processing unit 31, which is magnification processing means, for carrying out magnification processing of image data; and other processing units 32, 33, by means of these processing units, further appropriate processing is carried out on image data from the memory 7 (image data appropriately processed by the first image data processor 2) to allow realizing a service instructed by a user operation (operation of the operative display device 10 or the PC 16). The other processing units 32, 33 perform, on the image data appropriately processed by the first image data processor 2, image processing other than magnification processing, for instance filtering, color conversion (RGB to CMYK), and halftone processing.

The HDD 5 is a mass storage device (memory device) for storing electronic data that is used also in a desktop PC. In the HDD there is stored mainly image data and information ancillary to image data in the MFP 100. In the present embodiment, there is used a hard disk having a standard ATA bus connection with enhanced IDE (integrated drive electronics). The HDD 5, together with the memory 7, functions as image storage means. Other mass storage devices, such as MO, CD-R, CD-RW, DVD+R, DVD+RW, DVD-R, DVD-RW, DVD-RAM or the like, may also be used instead of the HDD 5.

The CPU 6 is a microprocessor that governs all control in the MFP 100. In the present embodiment there is used an integrated microprocessor (integrated CPU), which has become widespread in recent years, and in which a single CPU core is supplemented with a +α function. Herein there may be used, for instance, a CPU having integrated therein a connection function with a universal I/F, and/or a bus connection function using a cross-bar switch such RM11100 manufactured by PMC-Sierra, Inc.

The memory 7 is a volatile memory for temporarily storing data being exchanged, with a view to absorbing differences in speed during bridging between various types of bus standards, absorbing differences in processing speeds among the connected components themselves, and for storing temporarily programs and/or intermediate processed data during control of the MFP 100 by the CPU 6. Since high-speed processing is required of the CPU 6, during ordinary startup the system is started using a boot program stored in the ROM 14, and thereafter the process is carried out by a program expanded in the high-speed accessible memory 7. In the present embodiment, there is used a standardized DIMM (duel inline memory module) used in PCs. The program expanded in the memory 7 is, for instance, an OS (operating system) and/or a below-described application software (hereinafter "application" for short), stored in the ROM 14 or the HDD 5.

The plotter I/F device 8, which is image output means, performs bus bridge processing for outputting image data to a dedicated I/F of the plotter device 9 upon receipt of CMYK image data sent via a universal I/F integrated in the CPU 6. The universal I/F employed in the present embodiment is a PCI-Express bus.

Upon receiving CMYK image data, the plotter device 9 outputs the received image data on paper (transfer paper) as a visible image, using for instance an electrophotographic process that employs laser beams.

The SB 13, which is a chipset used in PCs, is a versatile electronic device called "southbridge". The SB 13, which realizes bus bridge functions in a versatile circuit form, is widely used in the architecture of a CPU system that comprises mainly PCI-Express and an ISA bridge. In the present embodiment, the SB 13 functions as a bridge to the ROM 14.

The ROM 14 is a memory for storing programs (including a boot program) that are executed during control of the MFP 100 by the CPU 6.

The operative display device 10, which is a section acting as an interface between the user and the MFP 100, and which comprises a display device such as an LCD (liquid crystal display device) and a key switch, displays on a display device various status and/or operative procedures of the MFP 100, and detects the operation of a key switch by the user. In the present embodiment, the operative display device 10 is connected to the CPU 6 via a PCI-Express bus.

The line I/F device 11 is a device that connects the PCI-Express bus with a telephone line. The line I/F device 11 enables the MFP 100 to exchange various data with a fax machine 15 via a telephone line, and enables also the MFP 100 to exchange data with another external device (image processing apparatus) such as an MFP comprising fax transmission/reception functions. The line I/F device 11 functions as image output means.

The fax machine 15 is an ordinary fax machine that exchanges image data with the MFP 100 via a telephone line.

The external I/F device 12 is a device that connects the PCI-Express bus and an external device. The external I/F device 12 enables the MFP 100 to exchange various data with the PC 16 and to communicate with another external device such as an MFP comprising a communication function. In the present embodiment, a network such as Ethernet (registered trademark) is used as the connection interface. That is, the MFP 100 is connected to a network via the external I/F device 12. The external I/F device 12 functions as image output means.

The PC 16 is a personal computer for carrying out input and output of various controls and image data into the MFP 100 in accordance with the operation of an input device, such as a keyboard, a mouse or the like by the user, through execution of installed application software and/or drive software by the CPU.

Herein, the functions according to the present invention, i.e. functions as service selection means, magnification ratio setting means and magnification ratio distribution determining means, can be realized by controlling the MFP 100 through execution by the CPU 6 of programs in the memory 7.

The services that the MFP 100 provides to the user include a copy service, a printer service, a scanner delivery service, a fax transmission service, a D-box (document box) service, a copy+D-box service, a scanner delivery+D-box service, a fax transmission+D-box service, and the like.

The copy service is a service whereby a document image is read by the image reading device 1, and the image data thereof (actually image data processed by the first image data processor 2 and the second image data processor 4) is sent to the plotter device 9 and is printed on paper as a visible image. The application for realizing the copy service is called a copy application.

The printer service is a service whereby print data such as writing data or a character code from the PC 16 is developed into image data that is sent to the plotter device 9 and is printed on paper as a visible image. The application for realizing the printer service is called a printer application.

The scanner delivery service is a service whereby an image of a document is read by the image reading device 1, and the image data thereof is delivered to a preset external device such as the PC 16 or the like through the external I/F device 12, by means of electronic mail or the like. The application for realizing the scanner delivery service is called a scanner application.

The fax transmission service is a service whereby an image of a document is read by the image reading device 1, and the image data thereof is sent as a fax transmission through the line I/F device 11 to a preset external device such as the fax machine 15 or the like, and/or a service whereby image data already stored in the HDD 5 similarly sent as a fax transmission to a preset external device. The application for realizing the fax transmission service is called a fax application.

The D-box service is a service involving an operation whereby an image of a document is read by the image reading device 1, the image data thereof is stored in the HDD 5, the image data stored in the HDD 5 is sent to the plotter device 9 and is printed on paper as a visible image, or a service in which the above stored image data is delivered to a preset external device such as the PC 16 or the like through the external I/F device 12, by means of electronic mail or the like, or in which the above stored image data is sent as a fax transmission through the line I/F device 11 to a preset external device such as the fax machine 15 or the like. The D-box service can be realized by the scanner application, the printer application or the fax application.

The copy+D-box service is a service in which an image of a document is read by the image reading device 1 and the image data thereof is sent to the plotter device 9, to be printed on paper as a visible image, while being stored in the HDD 5. The copy+D-box service can be realized by the copy application.

The scanner delivery+D-box service is a service in which an image of a document is read by the image reading device 1 and the image data thereof is delivered to a preset external device such as the PC 16 or the like through the external I/F device 12, by means of electronic mail or the like, while being stored in the HDD 5. The scanner deliver+D-box service can be realized by the scanner application.

The fax transmission+D-box service is a service in which an image of a document is read by the image reading device 1 and the image data thereof is sent as a fax transmission through the line I/F device 11 to a preset external device such as the fax machine 15 or the like, while being stored in the HDD 5. The fax transmission+D-box service can be realized by the fax application.

Among these services, the copy service, the printer service, the scanner delivery service and the fax transmission service correspond to a "service for carrying out printing or outward transmission (service relating to outputting of image data)". The copy+D-box service, the scanner delivery+D-box service and the fax transmission+D-box service correspond to a "service for carrying out permanent storage in a memory device while carrying out printing or outward transmission (service for carrying out permanent storage while outputting image data)".

Herein, the "service for carrying out printing or outward transmission" is a service that does not include permanent storage in a memory device (HDD 5), and in which, after use of the service, the image data does not become permanently stored as a result, and hence the image data cannot be reused. Accordingly, such a service is valuable to the user in that reuse of the image data is not a concern, which increases thus the output throughput during use of the service. The magnification ratio is determined, therefore, focusing on enhancing output throughput to the extent that image quality is not impaired.

The "service for carrying out permanent storage in a memory device while carrying out printing or outward transmission" is a service that includes permanent storage in a memory device and in which, after use of the service, the image data becomes permanently stored as a result. Hence, reuse of the image data must be assumed. The requirements posed by "reuse" vary greatly for a level where there may be obtained a same result under same output conditions as in a previous use, and for a level where it is desired to obtain a different result under different output conditions than in a previous use. These requirement levels vary for each user, and hence they must accommodate any user. There are thus determined optimal magnifications that take into account reusability and output throughput, to the extent that image quality is not impaired, in accordance with respective requirement levels.

Embodiments of the MFP 100 according to the present invention having the above configuration are explained in detail next for different operations.

First Embodiment

A first embodiment of an operation example, in which an arbitrary service provided by the MFP 100 is used, will be explained first with reference to FIG. 4.

(1) Selection of a Single Service

The user sets a document in the image reading device 1 and instructs sequentially selection of a desired service [S], setting of a magnification ratio [S-Z] and/or other output conditions, and service start, by operating the operative display device 10. When, for instance, the user selects printer service, there is no need to set a document. In that case the operation by the user is carried out in an external device such as the PC 16 or the like.

The operative display device 10 sequentially converts the information of these instructions into control command data in the devices, and issues the control command data. The issued control command data is notified to the CPU 6 via a PCI-Express bus. Upon receipt of a control command to the effect of service [S] selection, the CPU 6 starts the process routine illustrated in FIG. 4 and selects first a service [S] in step S1, and in step S2 selects an operation process program (application) of the service [S]. Next, upon receipt of a control command to the effect of setting a magnification ratio [S-Z] and/or other output conditions, the CPU 6 sets these output conditions in step S3 and stores the settings in the memory 7.

Lastly, upon receipt of a control command for service start, the CPU 6 moves on to the step S4 and executes in accordance therewith the operation process program of the service [S]. The CPU 6 determines then, for the set magnification ratio [S-Z], the optimal distribution of the magnifications of the first image data processor 2 (actually the magnification processing unit 21) and of the second image data processor 4 (actually the magnification processing unit 31). Hereinafter the magnification ratio of the first image data processor 2 is denoted [S-Z1] and the magnification ratio of the second image data processor 4 is denoted [S-Z2]. In the magnification ratio [S-Z1] allocated to the first image data processor 2, the magnification ratio in the sub-scanning direction may be used as the magnification ratio for sub-scanning mechanical magnification of the image reading device 1.

Next, the CPU 6 carries out sequentially the operation process of the service [S]. For instance, image data obtained through scanning of a document by the image reading device 1 is subjected by the first image data processor 2 to magnification processing with the optimally allocated magnification ratio [S-Z1], as well as to other required image processing (image processing corresponding to set output conditions), and outputs the resulting image data to the bus controller 3.

Upon receipt of the image data from the first image data processor 2, the bus controller 3 stores the image data in the memory 7 via the CPU 6. When the service [S] is a "service with permanent storage", and when "reuse" requires a level where it is desired to obtain a different result under different output conditions than in a previous use, the image data stored in the memory 7 is kept stored also in the HDD 5. Herein, "services in which permanent storage is also carried out" include D-box service, copy+D-box service, scanner delivery+D-box service, and fax transmission+D-box service.

The image data stored in the memory 7 is sent by the CPU 6 to the second image data processor 4 via the bus controller 3. The second image data processor 4 subjects the received image data to magnification processing with the optimally allocated magnification ratio [S-Z2], as well as to other required image processing, and outputs the resulting image data to the bus controller 3.

Upon receipt of the image data from the second image data processor 4, the bus controller 3 stores the image data in the memory 7 via the CPU 6. When the service [S] is a service in which permanent storage is also carried out, and when "reuse" requires a level where there may be obtained a same result under same output conditions as in a previous use, the image data stored in the memory 7 is kept stored also in the HDD 5.

In case of printing, the image data stored in the memory 7 is sent next by the CPU 6 to the plotter device 9 via the plotter I/F device 8, and the plotter device 9 outputs and prints the received image data on paper, as a visible image, thereby generating a copy of the document. In case of transmission to an external device, the CPU 6 transmits the image data to the fax machine 15, the PC 16 or the like via the line I/F device 11 or the external I/F device 12.

(2) Selection of a Plurality of Services

An overview of the entire operation when a plurality of services are selected will be explained first.

The operation "image reading device 1→first image data processor 2→memory 7" is carried out for all services. Thereafter, the operation "memory 7→second image data processor 4→plotter I/F device 8, line I/F device 11 or external I/F device 12" is carried out for each service. Given the above operations, an operation in which two services are selected will be explained below. The operation in case of selecting three or more services would involve the same procedure, and hence an explanation thereof will be omitted.

The user sets a document in the image reading device 1 and instructs sequentially selection of two desired services [S1, S2], setting of a magnification ratio [S1-Z, S2-Z] and/or other output conditions, and service start, by operating the operative display device 10. The operative display device 10 sequentially converts the information of these instructions into control command data in the devices, and issues the control command data. The issued control command data is notified to the CPU 6 via a PCI-Express bus.

Figure 4:
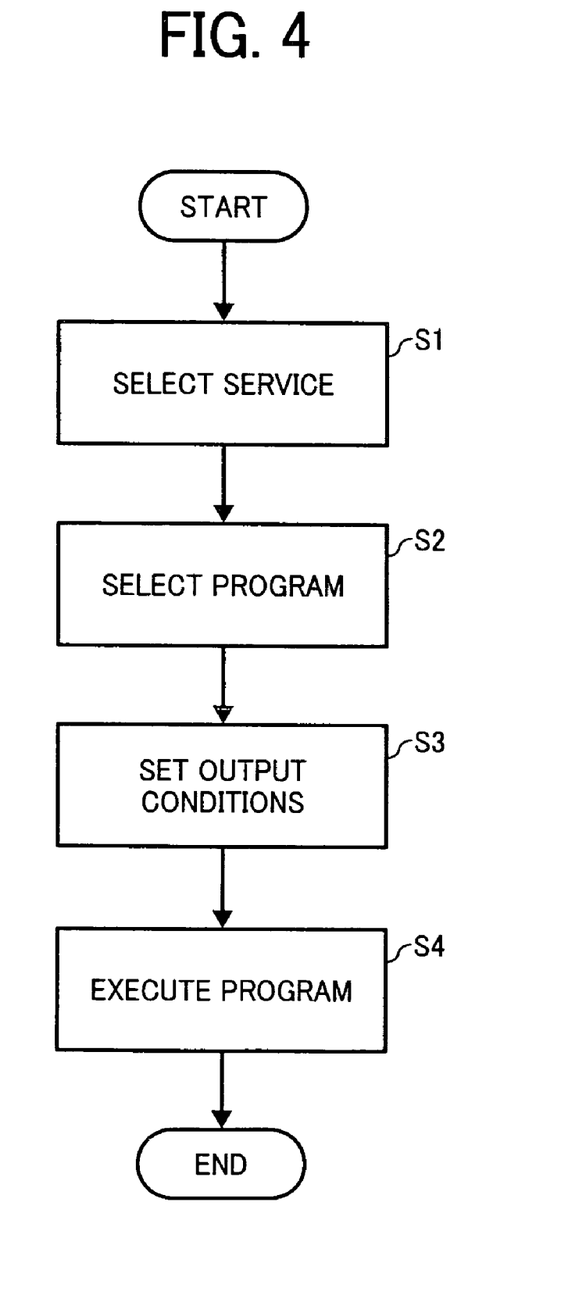
FIG. 4 is a flow diagram of an operation in the image forming apparatus according to the present invention.

Upon receipt of a control command to the effect of service [S1, S2] selection, the CPU 6 starts the process routine illustrated in FIG. 4 and selects first a service [S1, S2] in step S1, and in step S2 selects an operation process program of the service [S1, S2]. Next, upon receipt of a control command to the effect of setting a magnification ratio [S1-Z, S2-Z] and/or other output conditions, the CPU 6 sets these output conditions in step S3 and stores the settings in the memory 7. Lastly, upon receipt of a control command for service start, the CPU 6 moves on to the step S4 and executes in accordance therewith the operation process program of the service [S1, S2]. The CPU 6 determines then, for the set magnification ratio [S1-Z, S2-Z], the optimal distribution of the magnifications of the first image data processor 2 and of the second image data processor 4. Hereinafter, the magnification ratio of the first image data processor 2 is denoted [S common-Z1], and the magnification ratio of the second image data processor 4 is denoted [S1-Z2, S2-Z2]. In the magnification ratio [S common-Z1] allocated to the first image data processor 2, the magnification ratio in the sub-scanning direction may be used as the magnification ratio for sub-scanning mechanical magnification of the image reading device 1.

Next, the CPU 6 carries out sequentially the operation process of the service [S1, S2]. For instance, image data obtained through scanning of a document by the image reading device 1 is subjected by the first image data processor 2 to magnification processing with the optimally allocated magnification ratio [S common-Z1], as well as to other required image processing, and outputs the resulting image data to the bus controller 3. Upon receipt of the image data from the first image data processor 2, the bus controller 3 stores the image data in the memory 7 via the CPU 6.

In the operation thus far, the services [S1, S2] are common. Henceforth, a respective operation is carried out for each service [S1, S2].

The image data stored in the memory 7 is sent by the CPU 6 to the second image data processor 4 via the bus controller 3. The second image data processor 4 subjects the received image data to magnification processing with the optimally allocated magnification ratio [S1-Z2 or S2-Z2], as well as to other required image processing, and outputs the resulting image data to the bus controller 3.

Upon receipt of the image data from the second image data processor 4, the bus controller 3 stores the image data in the memory 7 via the CPU 6. In case of printing, the image data stored in the memory 7 is sent next by the CPU 6 to the plotter device 9 via the plotter I/F device 8, and the plotter device 9 outputs and prints the received image data on paper, as a visible image, thereby generating a copy of the document. In case of transmission to an external device, the CPU 6 transmits the image data to the fax machine 15, the PC 16 or the like via the line I/F device 11 or the external I/F device 12.

Upon selection of services provided to a user and setting of a magnification ratio, the MFP 100 in the first embodiment allows increasing output throughput and improving user-friendliness by determining a distribution of respective magnification ratios for the first image data processor 2 and the second image data processor 4 in accordance with the selected service, thereby subjecting the image data from the image reading device 1 or the memory 7 to magnification processing in an optimal image data processor and with an optimal magnification ratio in accordance with the service provided to the user.

Second Embodiment

A second embodiment of an operation example, in which there is used a "service for carrying out printing and/or outward transmission" provided by the MFP 100, is explained next. The operation explained herein corresponds to a case where a copy service (in this example, "S: 50% reduction copy") is used as the "service for carrying out printing and/or outward transmission".

The user sets a document in the image reading device 1 and instructs sequentially selection of a desired service [S], setting of a magnification ratio [S-Z: 50%] and/or other output conditions, and service start, by operating the operative display device 10. The operative display device 10 sequentially converts the information of these instructions into control command data in the devices, and issues the control command data. The issued control command data is notified to the CPU 6 via a PCI-Express bus.

Upon receipt of a control command to the effect of service [S] selection, the CPU 6 starts the process routine illustrated in FIG. 4 and selects first a service [S] in step S1, and in step S2 selects an operation process program (copy application) of the service [S]. Next, upon receipt of a control command to the effect of setting a magnification ratio [S-Z: 50%] and/or other output conditions, the CPU 6 sets these output conditions in step S3 and stores the settings in the memory 7.

Lastly, upon receipt of a control command for service start, the CPU 6 moves on to the step S4 and executes in accordance therewith the operation process program of the service [S]. The CPU 6 determines then, for the set magnification ratio [S-Z: 50%], an optimal distribution of the magnification ratios, so as to yield a magnification ratio [S-Z1: 50%] for the first image data processor 2, and a magnification ratio [S-Z2: 100% (no magnification)] for the second image data processor 4. In the magnification ratio [S-Z1: 50%] allocated to the first image data processor 2, the magnification ratio in the sub-scanning direction may be used as the magnification ratio [50%] for sub-scanning mechanical magnification of the image reading device 1. In this case, the magnification ratio in the sub-scanning direction of the first image data processor 2 becomes [S-Z1: main scanning direction 50%, sub-scanning direction 100%].

Next, the CPU 6 carries out sequentially the operation process of the service [S]. For instance, image data obtained through scanning of a document by the image reading device 1 is subjected by the first image data processor 2 to magnification processing with [S-Z1: 50%], as well as to other required image processing, and outputs the resulting image data to the bus controller 3. Alternatively, image data obtained through scanning of a document by the image reading device 1, with a magnification ratio [50%] for sub-scanning mechanical magnification, is subjected by the first image data processor 2 to magnification processing with [S-Z1: main scanning direction 50%, sub-scanning direction 100%], as well as to other required image processing, and outputs the resulting image data to the bus controller 3.

Upon receipt of the image data from the first image data processor 2, the bus controller 3 stores the image data in the memory 7 via the CPU 6. The image data stored in the memory 7 is sent to the second image data processor 4 via the CPU 6 and the bus controller 3. The second image data processor 4 subjects the received image data to magnification processing with the suitably allocated magnification ratio [S-Z2: 100% (no magnification)], as well as to other required image processing, and outputs the resulting image data to the bus controller 3.

Upon receipt of the image data from the second image data processor 4, the bus controller 3 stores the image data in the memory 7 via the CPU 6. Next, the image data stored in the memory 7 is sent next by the CPU 6 to the plotter device 9 via the plotter I/F device 8, and the plotter device 9 outputs and prints the received image data on paper, as a visible image, thereby generating a copy of the document.

In the second embodiment, thus, when the selected service is a "service for carrying out printing and/or outward transmission (service relating to output of image data)", the MFP 100 determines the distribution of the respective magnifications of the first image data processor 2 and the second image data processor 4 so as to carry out magnification processing with the set magnifications in the first image data processor 2, with a view to increasing processing speed and improving output throughput as much as possible provided that image quality is not impaired.

When setting reduction (lower resolution) of image data, the size of the image data becomes smaller as a result. This reduces bus load in the bus controller 3 and increase hence processing speed. A further increase in processing speed can be anticipated by combining such image data reduction with the sub-scanning mechanical magnification in the image reading device 1. That is, output throughput can be improved in the service for carrying out printing and/or outward transmission, without impairing image quality.

Third Embodiment

A third embodiment of another operation example, in which there is used a "service for carrying out printing and/or outward transmission" provided by the MFP 100, is explained next. The operation explained herein corresponds to a case where two services, a scanner delivery service (in this example, "S1: 200 dpi scanner delivery") and a fax transmission service (in this example, "S2: 200 dpi fax transmission"), are used as the "service for carrying out printing and/or outward transmission". If no magnification processing (resolution conversion) is carried out, there applies a magnification of 600 dpi.

The user sets a document in the image reading device 1 and instructs sequentially selection of a desired service [S1, S2], setting of a magnification ratio (resolution) [S1-Z: 33% (200 dpi), S2-Z: 33% (200 dpi)] and/or other output conditions, and service start, by operating the operative display device 10. The operative display device 10 sequentially converts the information of these instructions into control command data in the devices, and issues the control command data. The issued control command data is notified to the CPU 6 via a PCI-Express bus.

Upon receipt of a control command to the effect of service [S1, S2] selection, the CPU 6 starts the process routine illustrated in FIG. 4 and selects first a service [S1, S2] in step S1, and in step S2 selects an operation process program (scanner application, fax application) of the service [S1, S2]. Next, upon receipt of a control command to the effect of setting a magnification ratio (resolution) [S1-Z; 33% (200 dpi), S2-Z: 33% (200 dpi)] and/or other output conditions, the CPU 6 sets these output conditions in step S3 and stores the settings in the memory 7.

Lastly, upon receipt of a control command for service start, the CPU 6 moves on to the step S4 and executes in accordance therewith the operation process program of the service [S1, S2]. The CPU 6 determines then the optimal distribution of the magnifications of the first image data processor 2 and of the second image data processor 4, for the set magnification ratio (resolution) [S1-Z: 33% (200 dpi), S2-Z; 33% (200 dpi)], so that the magnification ratio of the first image data processor 2 is [S common-Z1: 33%] and the magnification ratio of the second image data processor 4 is [S1-Z2: 100% (no resolution conversion), S2-Z2: 100% (no resolution conversion)]. In the magnification ratio [S common-Z1: 33%] allocated to the first image data processor 2, the magnification ratio in the sub-scanning direction may be used as the magnification ratio for sub-scanning mechanical magnification [33%] of the image reading device 1. In this case, the magnification ratio in the sub-scanning direction of the first image data processor 2 becomes [S common-Z1: main scanning direction 33%, sub-scanning direction 100%].

Next, the CPU 6 carries out sequentially the operation process of the service [S1, S2]. For instance, image data obtained through scanning of a document by the image reading device 1 is subjected by the first image data processor 2 to magnification processing with the optimally allocated magnification ratio [S common-Z1: 33%], as well as to other required image processing, and outputs the resulting image data to the bus controller 3. Alternatively, image data obtained through scanning of a document by the image reading device 1, with a magnification ratio [33%] for sub-scanning mechanical magnification, is subjected by the first image data processor 2 to magnification processing with [S common-Z1: main scanning direction 33%, sub-scanning direction 100%], as well as to other required image processing, and outputs the resulting image data to the bus controller 3.

Upon receipt of the image data from the first image data processor 2, the bus controller 3 stores the image data in the memory 7 via the CPU 6.

In the operation thus far, the services [S1, S2] are common. Henceforth, a respective operation is carried out for each service [S1: 200 dpi scanner delivery, S2: 200 dpi fax transmission]. These operations are denoted (a) and (b) hereinafter.

(a) Operation of the Service [S1: 200 dpi Scanner Delivery]

The image data stored in the memory 7 is sent by the CPU 6 to the second image data processor 4 via the bus controller 3. The second image data processor 4 subjects the received image data to magnification processing with an optimally allotted magnification ratio [S1-Z2: 100% (no resolution conversion)], as well as to other required image processing, and outputs the resulting image data to the bus controller 3. Upon receipt of image data from the second image data processor 4, the bus controller 3 stores the image data in the memory 7 via the CPU 6. Next, the image data stored in the memory 7 is sent by the CPU 6 to an external device such as the PC 16 or the like via the external I/F device 12.

(b) Operation of the Service [S2: 200 dpi Fax Transmission]

Image data stored in the memory 7 is sent by the CPU 6 to the second image data processor 4 via the bus controller 3. The second image data processor 4 subjects the received image data to magnification processing with an optimally allotted magnification ratio [S2-Z2: 100% (no resolution conversion)], as well as to other required image processing, and outputs the resulting image-data to the bus controller 3. Upon receipt of image data from the second image data processor 4, the bus controller 3 stores the image data in the memory 7 via the CPU 6. Next, the image data stored in the memory 7 is sent by the CPU 6 to an external device such as the fax machine 15 or the like via the line I/F device 11.

In the third embodiment, thus, when the selected service is "a plurality of services for carrying out printing and/or outward transmission", and when the magnification ratio set for each of these services is the same throughout, the MFP 100 determines the distribution of the respective magnifications of the first image data processor 2 and the second image data processor 4 so as to carry out magnification processing in the first image data processor 2 with the magnifications set for each service, in order to increase processing speed and improving output throughput as much as possible provided that image quality is not impaired.

When setting reduction (lower resolution) of image data, the size of the image data becomes smaller as a result. This reduces bus load in the bus controller 3 and increase hence processing speed. A further increase in processing speed can be anticipated by combining such image data reduction with the sub-scanning mechanical magnification in the image reading device 1. That is, output throughput can be improved in the plurality of services for carrying out printing and/or outward transmission, without impairing image quality.

Fourth Embodiment

A fourth embodiment of another operation example, in which there is used a "service for carrying out printing and/or outward transmission" provided by the MFP 100, is explained next. The operation explained herein corresponds to a case where two services, a scanner delivery service (in this example, "S1: 300 dpi scanner delivery") and a fax transmission service (in this example, "S2: 200 dpi fax transmission"), are used as the "service for carrying out printing and/or outward transmission". If no magnification processing (resolution conversion) is carried out, there applies a magnification of 600 dpi.

The user sets a document in the image reading device 1 and instructs sequentially selection of a desired service [S1, S2], setting of a magnification ratio (resolution) [S1-Z: 50% (300 dpi), S2-Z: 33% (200 dpi)] and/or other output conditions, and service start, by operating the operative display device 10.

The operative display device 10 sequentially converts the information of these instructions into control command data in the devices, and issues the control command data. The issued control command data is notified to the CPU 6 via a PCI-Express bus. Upon receipt of a control command to the effect of service [S1, S2] selection, the CPU 6 starts the process routine illustrated in FIG. 4 and selects first a service [S1, S2] in step S1, and in step S2 selects an operation process program of the service [S1, S2]. Next, upon receipt of a control command to the effect of setting a magnification ratio (resolution) [S1-Z: 50% (300 dpi), S2-Z: 33% (200 dpi)] and/or other output conditions, the CPU 6 sets these output conditions in step S3 and stores the settings in the memory 7.

Lastly, upon receipt of a control command for service start, the CPU 6 moves on to the step S4 and executes in accordance therewith the operation process program of the service [S1, S2]. The CPU 6 determines then the optimal distribution of the magnifications of the first image data processor 2 and of the second image data processor 4, for the set magnification ratio (resolution) [S1-Z: 50% (300 dpi), S2-Z: 33% (200 dpi)], so that the magnification ratio of the first image data processor 2 is [S common-Z1: 100% (no resolution conversion)] and the magnification ratio of the second image data processor 4 is [S1-Z2: 50%, S2-Z2: 33%].

Next, the CPU 6 carries out sequentially the operation process of the service [S1, S2]. For instance, image data obtained through scanning of a document by the image reading device 1 is subjected by the first image data processor 2 to magnification processing with the [S common-Z1: 100% (no resolution conversion)], as well as to other required image processing, and outputs the resulting image data to the bus controller 3. Upon receipt of the image data from the first image data processor 2, the bus controller 3 stores the image data in the memory 7 via the CPU 6.

In the operation thus far, the services [S1, S2] are common. Henceforth, a respective operation is carried out for each service [S1: 300 dpi scanner delivery, S2: 200 dpi fax transmission]. These operations are denoted (a) and (b) hereinafter.

(a) Operation of the Service [S1: 300 dpi Scanner Delivery]

The image data stored in the memory 7 is sent by the CPU 6 to the second image data processor 4 via the bus controller 3. The second image data processor 4 subjects the received image data to magnification processing with an optimally allotted magnification ratio [S1-Z2: 50% (conversion to 300 dpi)], as well as to other required image processing, and outputs the resulting image data to the bus controller 3. Upon receipt of image data from the second image data processor 4, the bus controller 3 stores the image data in the memory 7 via the CPU 6. Next, the image data stored in the memory 7 is sent by the CPU 6 to an external device such as the PC 16 or the like via the external I/F device 12.

(b) Processing of the Service [S2: 200 dpi Fax Transmission]

Image data stored in the memory 7 is sent by the CPU 6 to the second image data processor 4 via the bus controller 3. The second image data processor 4 subjects the received image data to magnification processing with an optimally allotted magnification ratio [S2-Z2: 33% (conversion to 200 dpi)], as well as to other required image processing, and outputs the resulting image data to the bus controller 3. Upon receipt of image data from the second image data processor 4, the bus controller 3 stores the image data in the memory 7 via the CPU 6. Next, the image data stored in the memory 7 is sent by the CPU 6 to an external device such as the fax machine 15 or the like via the line I/F device 11.

In the fourth embodiment, thus, when the selected service is "a plurality of services for carrying out printing and/or outward transmission", and when the magnifications set for each of these services are different, the MFP 100 determines the distribution of the respective magnifications of the first image data processor 2 and the second image data processor 4 so as to carry out magnification processing in the second image data processor 4 with the magnifications set for each service. This allows realizing as a result a plurality of services for carrying out printing and/or outward transmission.

Fifth Embodiment

A fifth embodiment of an operation example, wherein there is used a "service for carrying out permanent storage in a memory device while performing printing and/or outward transmission" provided by the MFP 100, is explained next. The operation explained herein corresponds to a case where a copy+D-box service (in this example, "S: 50% reduction copy+D-box permanent storage") is used as the "service for carrying out permanent storage in a memory device while performing printing and/or outward transmission". In the present embodiment, "reuse" of D-box permanently stored image data requires a level where there may be obtained a same result under same output conditions as in a previous use.

The user sets a document in the image reading device 1 and instructs sequentially selection of a desired service [S], setting of a magnification ratio (resolution) [S-Z: 50%] and/or other output conditions, and service start, by operating the operative display device 10.

The operative display device 10 sequentially converts the information of these instructions into control command data in the devices, and issues the control command data. The issued control command data is notified to the CPU 6 via a PCI-Express bus. Upon receipt of a control command to the effect of service [S] selection, the CPU 6 starts the process routine illustrated in FIG. 4 and selects first a service [S] in step S1, and in step S2 selects an operation process program (copy application) of the service [S]. Next, upon receipt of a control command to the effect of setting a magnification ratio [S-Z: 50%] and/or other output conditions, the CPU 6 sets these output conditions in step S3 and stores the settings in the memory 7.

Lastly, upon receipt of a control command for service start, the CPU 6 moves on to the step S4 and executes in accordance therewith the operation process program of the service [S]. The CPU 6 determines then, for the set magnification ratio [S-Z: 50%] an optimal distribution of the magnification ratios, so as to yield a magnification ratio [S-Z1: 50%] for the first image data processor 2, and a magnification ratio [S-Z2: 100% (no magnification)] for the second image data processor 4. In the magnification ratio [S-Z1: 50%] allocated to the first image data processor 2, the magnification ratio in the sub-scanning direction may be used as the magnification ratio [50%] for sub-scanning mechanical magnification of the image reading device 1. In this case, the magnification ratio in the sub-scanning direction of the first image data processor 2 becomes [S-Z1: main scanning direction 50%, sub-scanning direction 100%].

Next, the CPU 6 carries out sequentially the operation process of the service [S]. For instance, image data obtained through scanning of a document by the image reading device 1 is subjected by the first image data processor 2 to magnification processing with [S-Z1: 50%], as well as to other required image processing, and outputs the resulting image data to the bus controller 3. Alternatively, image data obtained through scanning of a document by the image reading device 1, with a magnification ratio [50%] for sub-scanning mechanical magnification, is subjected by the first image data processor 2 to magnification processing with [S-Z1: main scanning direction 50%, sub-scanning direction 100%], as well as to other required image processing, and outputs the resulting image data to the bus controller 3.

Upon receipt of the image data from the first image data processor 2, the bus controller 3 stores the image data in the memory 7 via the CPU 6. The image data stored in the memory 7 is sent by the CPU 6 to the second image data processor 4 via the bus controller 3. The second image data processor 4 subjects the received image data to magnification processing with the suitably allocated magnification ratio [S-Z2: 100% (no magnification)], as well as to other required image processing, and outputs the resulting image data to the bus controller 3. Upon receipt of the image data from the second image data processor 4, the bus controller 3 stores the image data in the memory 7 via the CPU 6. The image data stored in the memory 7 is also kept stored in the HDD 5. Next, the image data stored in the memory 7 is sent next by the CPU 6 to the plotter device 9 via the plotter I/F device 8, and the plotter device 9 outputs and prints the received image data on paper, as a visible image, thereby generating a copy of the document.

Lastly, an explanation follows herein on the operation of a case of later reuse, by the user, of image data stored in the HDD 5. In this case, the user can only use the image data at a level where a same result may be obtained under the same output conditions as in a previous use, i.e. can only use the image data for "printing". In other words, output conditions such as those for transmission and/or enlargement cannot be modified. The user requests "print D-box stored data" by operating the operative display device 10. As a result of this request, the CPU 6 stores in the memory 7 the image data stored in the HDD 5. The image data stored in the memory 7 is sent next by the CPU 6 to the plotter device 9 via the plotter I/F device 8, and the plotter device 9 outputs and prints the received image data on paper, as a visible image, thereby generating a copy of the document.

In the fifth embodiment, thus, when the selected service is a "service for carrying out printing and/or outward transmission while storing data permanently in a memory device", the MFP 100 determines the distribution of the respective magnifications of the first image data processor 2 and the second image data processor 4 so as to carry out magnification processing in the first image data processor 2 with the set magnification ratio, affording thereby the same effect as the third embodiment.

That is, reuse becomes possible for a service in which permanent storage is carried out in a memory device while performing printing and/or outward transmission, with enhanced output throughput and without image quality impairment, at a level where there may be obtained a same result under same output conditions as in a previous use. Output throughput increases also when permanently stored image data is reused. That is because permanently stored image data has already undergone image processing by the first image data processor 2 under the output conditions of a previous use, and can thus be printed or transmitted as-is.

Sixth Embodiment

A sixth embodiment of another operation example, wherein there is used a "service for carrying out permanent storage in a memory device while performing printing and/or outward transmission" provided by the MFP 100, is explained next. The operation explained herein corresponds to a case where there is used a copy+D-box service (in this example, "S: 50% reduction copy+D-box permanent storage") as the "service for carrying out permanent storage in a memory device while performing printing and/or outward transmission". In the present embodiment, "reuse" of D-box permanently stored image data requires a level where it is desired to obtain a different result under different output conditions than in a previous use.

The user sets a document in the image reading device 1 and instructs sequentially selection of a desired service [S], setting of a magnification ratio (resolution) [S-Z: 50%] and/or other output conditions, and service start, by operating the operative display device 10. The operative display device 10 sequentially converts the information of these instructions into control command data in the devices, and issues the control command data. The issued control command data is notified to the CPU 6 via a PCI-Express bus. Upon receipt of a control command to the effect of service [S] selection, the CPU 6 starts the process routine illustrated in FIG. 4 and selects first a service [S] in step S1, and in step S2 selects an operation process program (copy application) of the service [S]. Next, upon receipt of a control command to the effect of setting a magnification ratio [S-Z: 50%] and/or other output conditions, the CPU 6 sets these output conditions in step S3 and stores the settings in the memory 7. Lastly, upon receipt of a control command for service start, the CPU 6 moves on to the step S4 and executes in accordance therewith the operation process program of the service [S]. The CPU 6 determines then, for the set magnification ratio [S-Z: 50%] an optimal distribution of the magnification ratios, so as to yield a magnification ratio [S-Z1: 100% (no magnification)] for the first image data processor 2, and a magnification ratio [S-Z2: 50%] for the second image data processor 4.

Next, the CPU 6 carries out sequentially the operation process of the service [S]. For instance, image data obtained through scanning of a document by the image reading device 1 is subjected by the first image data processor 2 to magnification processing with [S-Z1: 100% (no magnification)], as well as to other required image processing, and outputs the resulting image data to the bus controller 3. Upon receipt of the image data from the first image data processor 2, the bus controller 3 stores the image data in the memory 7 via the CPU 6. The image data stored in the memory 7 is also kept stored in the HDD 5. The image data stored in the memory 7 is sent by the CPU 6 to the second image data processor 4 via the bus controller 3. The second image data processor 4 subjects the received image data to magnification processing with the suitably allocated magnification ratio [S-Z2: 50%], as well as to other required image processing, and outputs the resulting image data to the bus controller 3. Upon receipt of the image data from the second image data processor 4, the bus controller 3 stores the image data in the memory 7 via the CPU 6. Next, the image data stored in the memory 7 is sent next by the CPU 6 to the plotter device 9 via the plotter I/F device 8, and the plotter device 9 outputs and prints the received image data on paper, as a visible image, thereby generating a copy of the document.

Lastly, an explanation follows here on the operation in a case of later reuse by the user of image data stored in the HDD 5. In this case, the user can only use the image data at a level where it is desired to obtain a different result under different output conditions than in a previous use, i.e., where reuse is possible by modifying of output conditions vis-à-vis a previous use, for instance for transmission, resolution conversion or the like. The user requests herein "200 dpi scanner delivery of D-box stored data" by operating the operative display device 10. As a result of this request, the CPU 6 stores in the memory 7 the image data stored in the HDD 5. The image data stored in the memory 7 is sent by the CPU 6 to the second image data processor 4 via the bus controller 3. The second image data processor 4 subjects the received image data to magnification processing (resolution conversion) with a magnification ratio [S-Z2: 33% (conversion to 200 dpi)], as well as to other required image processing, and outputs the resulting image data to the bus controller 3. Upon receipt of image data from the second image data processor 4, the bus controller 3 stores the image data in the memory 7 via the CPU 6. Next, the image data stored in the memory 7 is sent by the CPU 6 to an external device such as the PC 16 or the like via the external I/F device 12. Accordingly, the outputted result is wholly different from the output result in the first embodiment.

In the sixth embodiment, thus, when the selected service is a "services for carrying out printing and/or outward transmission while storing data permanently in a memory device", the distribution of the respective magnifications of the first image data processor 2 and the second image data processor 4 are determined so as to carry out magnification processing in the second image data processor 4 with the set magnification ratio. As a result, reuse becomes possible at a level where it is desired to obtain a different result under different output conditions than in a previous use, without image quality impairment. Reusability increases also when permanently stored image data is reused. That is because permanently stored image data has not been processed yet by the second image data processor 4, so that reuse is possible by setting various output conditions.

Seventh Embodiment

In the seventh embodiment there is explained an instance in which whether to carry out the operation of the fifth embodiment or the operation of the sixth embodiment is selected beforehand by operating the operative display device 10 (or operating an external device such as the PC 16 or the like) of the MFP 100. The item selected by the user is either (a) a level where there may be obtained a same result under the same output conditions as in a previous use, or (b) a level where it is desired to obtain a different result under different output conditions than in a previous use.

By operating the operative display device 10, the user selects either "(1) level where there may be obtained a same result under the same output conditions as in a previous use" or "(2) level where it is desired to obtain a different result under different output conditions than in a previous use" as the setting for reuse output conditions during D-box permanent storage.

When "(1) level where there may be obtained a same result under the same output conditions as in a previous use" is selected, the CPU 6 carries out the same operation as in the fifth embodiment. When "(2) level where it is desired to obtain a different result under different output conditions than in a previous use" is selected, the CPU 6 carries out the same operation as in the sixth embodiment.

In the seventh embodiment, thus, upon selection of a "service for carrying out permanent storage in a memory device while performing printing and/or outward transmission", through an instruction via the operative display device 10, and after selection of either the first image data processor 2 or the second image data processor 4 to carry out magnification processing, when the selected service is a "service for carrying out permanent storage in a memory device while performing printing and/or outward transmission", the MFP 100 determines the distribution of the respective magnifications of the first image data processor 2 and the second image data processor 4 so as to carry out magnification processing in the pre-selected first image data processor 2 or second image data processor 4, with the set magnification ratio, enabling thereby response to different requests and affording thus the same effect as the fifth and sixth embodiments.

The present invention has been explained on the basis of various embodiments applied to an MFP, but the present invention is not particularly limited thereto. The present invention can be used as a matter of course in image forming apparatuses such as a digital copier machine and/or fax machine having an image reading device (scanner or the like), but also in a printer or PC connectable to an image reading device, and in various image processing apparatuses such as a stand-alone image reading device.

A program according to the present invention is a program enabling a CPU (computer) that controls an image processing apparatus, such as an MFP or the like, to realize the functions relating to the present invention, i.e. to function as service selection means, magnification ratio setting means, and magnification ratio distribution determining means, such that he above-described effects can be achieved by executing such a program in a CPU.

This program may be stored originally in storage means such as a ROM, HDD or the like, or may be provided recorded in a CD-ROM, as a recording medium, or in a nonvolatile recording medium (memory) such as flexible disk, SRAM, EEPROM, memory card or the like. The program recorded in the nonvolatile recording medium may be installed in an MFP and be executed in a CPU, or may be read from the nonvolatile recording medium and be executed by the CPU, to enable execution of the above various procedures.

The program may also be executed following download from an external device connected to a network and comprising a recording medium in which the program is recorded, or from an external device in which the program is stored in storage means.

Upon selection of services provided to a user and setting of a magnification ratio, the image processing apparatus according to the present invention allows increasing output throughput and enhancing user-friendliness by determining a distribution of respective magnification ratios for the first image processing means and the second image processing means in accordance with the selected service, thereby subjecting the image data from the image reading means or the image storage means to magnification processing by optimal image processing means, with an optimal magnification ratio, in accordance with the service provided to the user.

Various modifications will become possible for those skilled in the art after receiving the teachings of the present disclosure without departing from the scope thereof.

What is claimed is:

1. An image processing apparatus, comprising:
   a first image processor for processing image data from an image reading device for reading an image of a document;
   an image storage device for storing the image data from said image reading device or said first image processor;
   a second image processor for processing the image data from said image storage device;
   an image output controller for outputting the image data from said first image processor, said image storage device or said second image processor;
   a magnification processing unit provided in said first image processor and said second image processor, for subjecting respective image data to magnification processing;
   at least one processor for selecting a service based on a first instruction from a user,
   the at least one processor for setting a magnification ratio for the image data based on a second instruction from the user, and
   the at least one processor for determining a distribution of respective magnification ratios between said first image processor and said second image processor based on the selected service and the set magnification ratio.

2. The image processing apparatus as claimed in claim 1, wherein when the selected service is a service relating to the output of the image data, said at least one processor determines the distribution of respective magnification ratios so that magnification processing with the set magnification ratio is carried out in said first image processor.

3. The image processing apparatus as claimed in claim 1, wherein when the selected service is a plurality of services relating to the output of the image data, and the set magnification ratio is the same for each service, said at least one processor determines the distribution of respective magnification ratios so that magnification processing with the magnification ratio set for each service is carried out in said first image processor.

4. The image processing apparatus as claimed in claim 1, wherein when the selected service is a plurality of services relating to the output of the image data, and the set magnification ratio is different for each service, said at least one processor determines the distribution of respective magnification ratios so that magnification processing with the magnification ratio set for each service is carried out in said second image processor.

5. The image processing apparatus as claimed in claim 1, wherein when the selected service is a service for carrying out permanent storage while outputting the image data, said at least one processor determines the distribution of respective magnification ratios so that magnification processing with the set magnification ratio is carried out in said first image processor.

6. The image processing apparatus as claimed in claim 1, wherein when the selected service is a service for carrying out permanent storage while outputting image data, said at least one processor determines the distribution of respective magnification ratios so that magnification processing with the set magnification ratio is carried out in said second image processor.

7. The image processing apparatus as claimed in claim 1, wherein said at least one processor selects one of said first image processor and said second image processor to carry out magnification processing upon selection of a service for carrying out permanent storage while outputting the image data, and wherein when the selected service is a service for carrying out permanent storage while outputting the image data, said at least one processor determines the distribution of respective magnification ratios so that magnification processing with the set magnification ratio is carried out in said first image processor or said second image processor which is selected by the at least one processor.

8. A method for magnification ratio distribution in an image processing apparatus, the method comprising:
   processing, by a first image processor, image data from an image reading device for reading an image of a document;
   storing, by an image storage device, the image data from the image reading device or the first image processor;
   processing, by a second image processor, the image data from the image storage device;

outputting the image data from the first image processor, the image storage device, or the second image processor;

selecting, by at least one processor, a service based on a first instruction from a user;

setting, by the at least one processor, a magnification ratio for the image data based on a second instruction from the user; and determining, by the at least one processor, a distribution of respective magnification ratios between the first image processor and the second image processor based on the selected service and the set magnification ratio.

9. The method as claimed in claim 8, wherein when the selected service is a service for outputting the image data, the determining step determines the distribution of respective magnification ratios so that magnification processing with said set magnification ratio is carried out in said first image processor.

10. The method as claimed in claim 8, wherein when the selected service is a plurality of services relating to the output of the image data, and said set magnification ratio is the same for each service, the determining step determines the distribution of respective magnification ratios so that magnification processing with the magnification ratio set for each service is carried out in said first image processor.

11. The method as claimed in claim 8, wherein when the selected service is a plurality of services relating to the output of the image data, and said set magnification ratio is different for each service, the determining step determines the distribution of respective magnification ratios so that magnification processing with the magnification ratio set for each service is carried out in said second image processor.

12. The method as claimed in claim 8, wherein when the selected service is a service for carrying out permanent storage while outputting the image data, the determining step determines the distribution of respective magnification ratios so that magnification processing with said set magnification ratio is carried out in said first image processor.

13. The method as claimed in claim 8, wherein when the selected service is a service for carrying out permanent storage while outputting the image data, the determining step determines the distribution of respective magnification ratios so that magnification processing with said set magnification ratio is carried out in said second image processor.

14. The method as claimed in claim 8, wherein when the selected service is a service for carrying out permanent storage while outputting the image data, the determining step determines the distribution of respective magnification ratios so that magnification processing with said set magnification ratio is carried out in said first image processor or said second image processor which is selected beforehand.

15. A non-transitory computer-readable recording medium in which a program is recorded, the program causes a computer for controlling an image processing apparatus to execute:

processing, by a first image processor, image data from an image reading device for reading an image of a document;

storing, by an image storage device, the image data from the image reading device or the first image processor;

processing, by a second image processor, the image data from the image storage device;

outputting the image data from the first image processor, the image storage device, or the second image processor;

selecting, by at least one processor, a service based on a first instruction from a user;

setting, by the at least one processor, a magnification ratio for the image data based on a second instruction from the user; and determining, by the at least one processor, a distribution of respective magnification ratios between the first image processor and the second image processor based on the selected service and the set magnification ratio.

16. The non-transitory computer-readable recording medium of claim 15, wherein when the selected service is a service for outputting image data, the determining step determines the distribution of respective magnification ratios so that magnification processing with said set magnification ratio is carried out in said first image processor.

17. The non-transitory computer-readable recording medium of claim 15, wherein when the selected service is a plurality of services relating to the output of the image data, and said set magnification ratio is the same for each service, the determining step determines the distribution of respective magnification ratios so that magnification processing with the magnification ratio set for each service is carried out in said first image processor.

18. The non-transitory computer-readable recording medium of claim 15, wherein when the selected service is a plurality of services relating to the output of the image data, and said set magnification ratio is different for each service, the determining step determines the distribution of respective magnification ratios so that magnification processing with the magnification ratio set for each service is carried out in said second image processor.

19. The non-transitory computer-readable recording medium of claim 15, wherein when the selected service is a service for carrying out permanent storage while outputting the image data, the determining step determines the-distribution of respective magnification ratios so that magnification processing with said set magnification ratio is carried out in said first image processor.

20. The non-transitory computer-readable recording medium of claim 15, wherein when the selected service is a service for carrying out permanent storage while outputting the image data, the determining step determines the-distribution of respective magnification ratios so that magnification processing with said set magnification ratio is carried out in said second image processor.

21. The non-transitory computer-readable recording medium of claim 15, wherein when the selected service is a service for carrying out permanent storage while outputting the image data, the determining step determines the-distribution of respective magnification ratios so that magnification processing with said set magnification ratio is carried out in said first image processor or said second image processor which is selected beforehand.

* * * * *